United States Patent
Keret et al.

(10) Patent No.: US 10,360,139 B2
(45) Date of Patent: Jul. 23, 2019

(54) IDENTIFYING TRANSPORT-LEVEL ENCODED PAYLOADS

(71) Applicants: HEWLETT-PACKARD DEVELOPMENT COMPANY, L.P., Houston, TX (US); Oded Keret, Yehud (IL); Leonid Pekel, Yehud (IL); Peng-Ji Yin, Shanghai (CN); Moshe Eran Kraus, Yehud (IL)

(72) Inventors: Oded Keret, Yehud (IL); Leonid Pekel, Yehud (IL); Peng-Ji Yin, Shanghai (CN); Moshe Eran Kraus, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 14/773,943

(22) PCT Filed: Mar. 12, 2013

(86) PCT No.: PCT/CN2013/072453
§ 371 (c)(1),
(2) Date: Sep. 9, 2015

(87) PCT Pub. No.: WO2014/139085
PCT Pub. Date: Sep. 18, 2014

(65) Prior Publication Data
US 2016/0034381 A1 Feb. 4, 2016

(51) Int. Cl.
*G06F 17/00* (2019.01)
*G06F 15/16* (2006.01)
(Continued)

(52) U.S. Cl.
CPC ...... *G06F 11/3672* (2013.01); *G06F 11/3668* (2013.01); *G06F 11/36* (2013.01); *G06F 16/40* (2019.01)

(58) Field of Classification Search
CPC ............. G06F 11/3688; G06F 11/3664; G06F 11/3684; G06F 11/323; G06F 11/36
See application file for complete search history.

(56) References Cited

U.S. PATENT DOCUMENTS 6,965,569 B1 * 11/2005 Carolan ............. H04N 1/00209
370/238
6,988,238 B1 * 1/2006 Kovacevic ............ H04L 1/0083
348/E5.108
(Continued)

FOREIGN PATENT DOCUMENTS

EP 2138936 A1 12/2009

OTHER PUBLICATIONS

Giovanni Vigna et al., Testing network-based intrusion detection signatures using mutant exploits, Oct. 25-29, 2004, [Retrieved on May 9, 2019]. Retrieved from the internet: 10 Pages (21-30) (Year: 2004).*

(Continued)

*Primary Examiner* — Anibal Rivera

(57) ABSTRACT

Identifying transport-level encoded payloads includes identifying transport-level encoded payloads from a recorded script in a display, determining multiple decoding option for at least one of the transport-level encoded payloads where the multiple decoding options includes a recommended chain, and displaying multiple decoding options with at least one of the transport-level encoded payloads.

19 Claims, 5 Drawing Sheets

(51) Int. Cl.
*G06F 11/36* (2006.01)
*G06F 16/40* (2019.01)

(56) References Cited

U.S. PATENT DOCUMENTS

| | | | |
|---|---|---|---|
| 7,016,940 B2 | 3/2006 | Matsuda et al. | |
| 8,125,987 B2* | 2/2012 | Rodgers | H04L 45/00 370/389 |
| 8,442,818 B2* | 5/2013 | Trainor | G10L 19/22 704/221 |
| 8,547,974 B1* | 10/2013 | Guruswamy | H04L 43/50 370/389 |
| 8,612,530 B1* | 12/2013 | Sapovalovs | H04L 43/50 707/602 |
| 8,819,286 B2* | 8/2014 | Naparstek | H04L 41/145 709/206 |
| 8,819,631 B2* | 8/2014 | Monza | G06F 9/45516 717/115 |
| 9,015,672 B2* | 4/2015 | Dause | G06F 11/3664 717/124 |
| 9,294,226 B2* | 3/2016 | Luby | H04L 67/06 |
| 9,787,759 B2* | 10/2017 | Slay, Jr. | H04L 67/10 |
| 2002/0143981 A1* | 10/2002 | DeLima | H04L 41/147 709/233 |
| 2004/0167749 A1* | 8/2004 | Friedman | G06F 11/36 702/186 |
| 2006/0069697 A1* | 3/2006 | Shraim | H04L 51/12 |
| 2006/0148556 A1 | 7/2006 | Weller | |
| 2006/0209709 A1* | 9/2006 | Kovacevic | H04N 21/23424 370/252 |
| 2007/0055879 A1* | 3/2007 | Luo | H04L 9/302 713/171 |
| 2007/0223660 A1* | 9/2007 | Dei | G10L 19/24 379/88.13 |
| 2007/0237143 A1* | 10/2007 | Rodgers | H04L 45/00 370/392 |
| 2009/0185562 A1* | 7/2009 | Kannan | H04L 12/1886 370/389 |
| 2010/0135637 A1* | 6/2010 | McDermott | G11B 27/034 386/344 |
| 2010/0142915 A1* | 6/2010 | McDermott | G11B 27/034 386/343 |
| 2011/0019971 A1* | 1/2011 | Yamane | H04N 5/44543 386/252 |
| 2011/0060594 A1* | 3/2011 | Trainor | G10L 19/22 704/500 |
| 2011/0060595 A1* | 3/2011 | Trainor | G10L 19/22 704/500 |
| 2011/0254917 A1* | 10/2011 | Schaffer | H04N 21/2343 348/43 |
| 2011/0299629 A1* | 12/2011 | Luby | H03M 13/3761 375/299 |
| 2012/0096185 A1* | 4/2012 | Naparstek | H04L 41/145 709/246 |
| 2012/0185823 A1* | 7/2012 | Monza | G06F 9/45516 717/115 |
| 2012/0290920 A1* | 11/2012 | Crossley | G06F 11/3664 715/234 |
| 2013/0254631 A1* | 9/2013 | Luby | H03M 13/356 714/776 |
| 2013/0254634 A1* | 9/2013 | Luby | H04L 67/06 714/776 |
| 2014/0032497 A1* | 1/2014 | Hughes, Jr. | G06F 16/40 707/636 |
| 2015/0012911 A1* | 1/2015 | Dause | G06F 11/3664 717/125 |

OTHER PUBLICATIONS

Martin Johns et al., XSSDS: Server-side Detection of Cross-site Scripting Attacks, 2008, [Retrieved on May, 9, 2019]. Retrieved from the internet: 10 Pages (335-344) (Year: 2008).*
Greymagic, Greymagic Online Script Decoder, 2008, 1 page <http://www.greymagic.com/security/tools/decoder/>.
International Search Report & Written Opinion, dated Dec. 12, 2013, PCT Patent Application No. PCT/CN2013/072453, 11 pages.
Sun, F. et al., Client-side Detection of XSS Worms by Monitoring Payload Propagation, Jun. 30, 2009, 16 pages <http://leo.cs.ucdavis.edu/papers/esorics09_xssworm.pdf>.

* cited by examiner

| Payloads | Recommended Chain | Other Chains | Other Commands |
|---|---|---|---|
| Payload 1 | Chain A | Chain B, Chain E | Do Not Decode |
| Payload 2 | Chain C | Chain A | Do Not Decode |
| Payload 3 | Chain D | Chain B, Chain C | Do Not Decode |

IDENTIFYING TRANSPORT-LEVEL ENCODED PAYLOADS

CROSS-REFERENCE TO RELATED APPLICATION

This application is a U.S. National Stage Application of and claims priority to International Patent Application No. PCT/CN2013/072453, filed on Mar. 12, 2013, and entitled "IDENTIFYING TRANSPORT-LEVEL ENCODED PAYLOADS."

BACKGROUND

A web application can use web automation tests to determine how the web application performs in terms of responsiveness and stability under a particular workload. A web automation test measures, investigates, or validates attributes of the web application, such as resource usage, reliability, or scalability. Further, web automation tests are performed by executing a test load script that is generated off of a recorded script that has transport-level encoded payloads. The scripts may be small programs written for a programming environment that automates the execution of a task. The transport-level encoded payloads are used to generate the load test script that simulates network traffic generated by the client device. Further, load test script can simulate a client device's behavior against the web application.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1A:
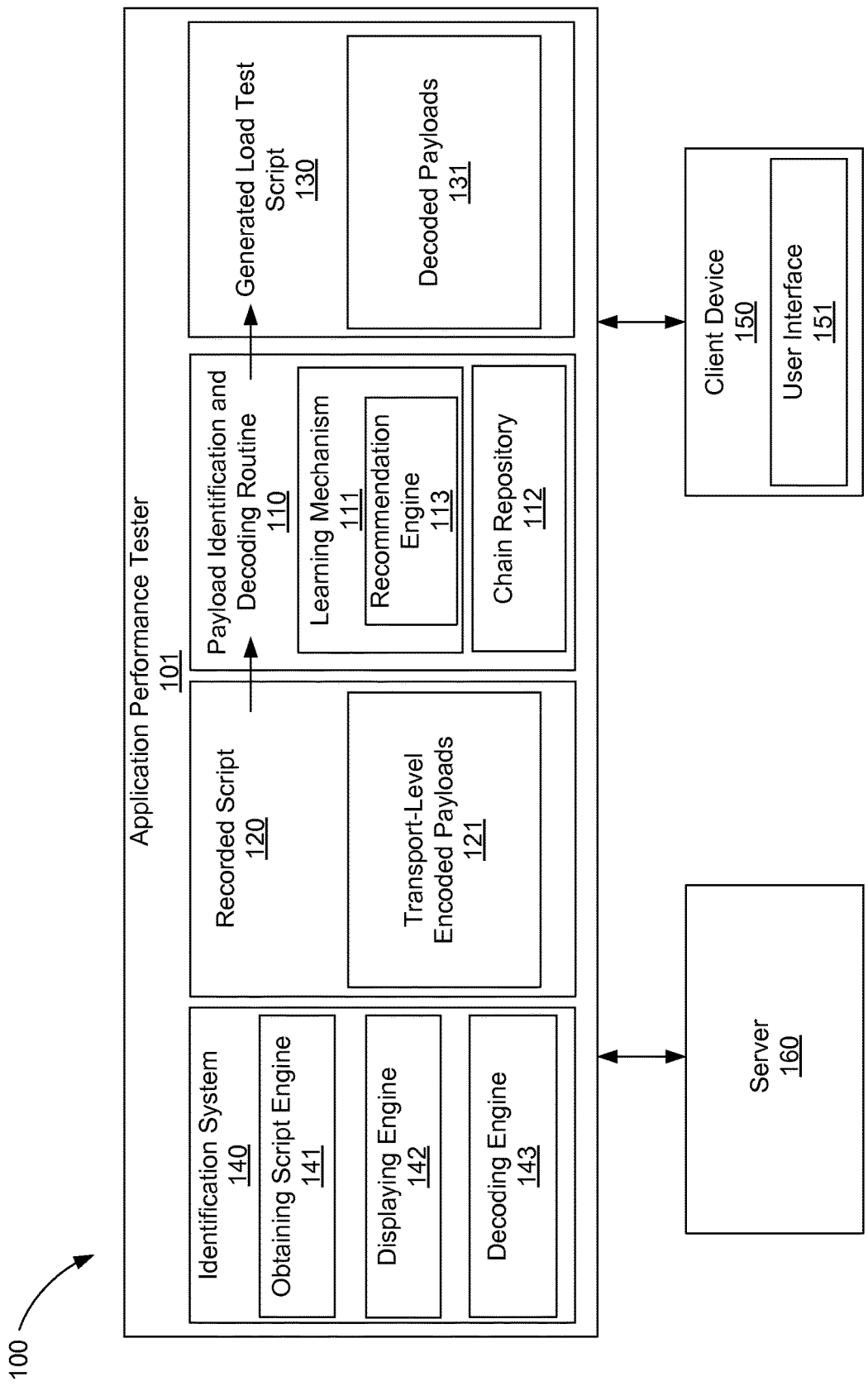
FIG. 1A is a diagram of an example of a system for identifying payloads, according to the principles described herein.

To test whether a web application is operating under acceptable operating conditions, a performance engineer can create web automation tests to determine how a web application performs in terms of responsiveness and stability under a particular workload. Web automation tests are performed by recording a script with transport-level encoded payloads based on a client device's communication with a server at a network level. The transport-level encoded payloads can be encoded in a number of encoding format. For example, transport-level encoded payloads can be encoded in base64 binary encodings, uniform resource locator (URL) encoding, locale-specific transformation format-8 bit (UTF-8) encoding, or others encodings.

Generally, a performance engineer manually identifies transport-level encoded payloads in the recorded script, manually identifies the type of encoding applied to the identified payloads, and manually decodes the identified payloads. A load test script is generated based on the decoded payloads from the recorded script. The load test script simulates network traffic generated by the web application which can be used to analyze the performance of the web application. While generating the load test script, the decoded transport-level payloads are passed as parameters to an application programming interface (API). The API is a protocol used as an interface by programming components to communicate with each other. Further, the API has a library that may include specification for routines, data structures, object classes, and variables. The generated load test script may be replayed to simulate a client device's behavior against the web application under test. If the test indicates that the web application is performing outside of acceptable operating parameters, the performance engineer can change operating conditions to improve the web application's performance.

Manually identifying transport-level encoded payloads in the recorded script is a burdensome task for a performance engineer. In one example, the performance engineer may not know that some of the transport-level payloads are encoded. Further, web automation tests do not notify a performance engineer that a specific encoding type exists. As mentioned above, a performance engineer manually identifies the type of encoding used on each transport-level encoded payload. In addition to manually identifying the existence of the transport-level encoded payloads, the performance engineer also manually determines the type of encoding applied to the identified transport-level encoded payload, which is also burdensome. Performance engineers generally receive extensive training to be able to identify encoding types. In some example, decoding a transport-level encoded payload in a recorded script involves regenerating the entire script, which can cause the performance engineer to lose all the work already done on the recorded script. Adding to the performance engineer's time consuming tasks, the performance engineer also manually generates the generated load test script based on the decoded transport-level encoded payloads.

The principles described herein include a method to identify transport-level encoded payloads. The method includes identifying transport-level encoded payloads in a recorded script and providing the user decoding options that can be used to decode the transport-level encoded payloads. The transport-level encoded payloads are identified automatically by an identification system that recognizes identifiers in the payloads, such a file extensions, symbols, character metadata, other identifiers, or combinations thereof. The identifier may indicate the type of encoding in which the transport-level encoded payloads are encoded.

The decoding options are customized for each of the identified transport-level encoded payloads because some decoding options may work well with some for some of the payloads while not work well with other payloads. The decoding options include at least one recommended decoding chain and, in some cases, other decoding chains that can also be used to decode the payloads. A chain is a sequence of set tasks that automatically run one after another that can be used to decode payloads or perform another task. The identifier and/or recognition of the encodings may be used by a recommendation engine to determine which chains should be recommended to the user decode the payloads.

The principles described herein identify the transport-level encoded payloads for the performance engineer without the performance engineer knowing which types of transport-level encoded payloads exist in the recorded scripts. Further, the performance engineer is also given decoding options to decode payloads without the performance engineer knowing the types of encodings or other characteristics that determine which type of decoding chains can decode the payloads.

The transport-level payloads can be encoded in a number of encoding formats. For example, the transport-level encoded payloads may be encoded using base64 binary encoding, URL encoding, UTF-8 encoding, American standard code for information interchange (ASCII) encoding, other encoding formats, or combination thereof.

The recorded script can be scanned to search for transport-level encoded payloads in the recorded script. To identify the transport-level encoded payloads the identification system recognizes the presence of an encoded payload with payload identifiers. A payload identifier may be a symbol, a file extension, a character, or any combination thereof to recognize a payload identifier. By using payload identifiers, each transport-level encoded payloads can be identified in the recorded script.

In response to identifying the existence of a transport-level encoded payload, the type of encoding for at least one of the transport-level encoded payloads is determined. Further, a learning mechanism is used to determine a type of encoding for at least one of the transport-level encoded payload. For example, a learning mechanism may be a heuristics repository to aid in determining the type of encoding for at least one transport-level encoded payload. In one example, a learning mechanism is used to determine that a transport-level encoded payload is encoded using Binary64 encoding, URL encoding, UTF-8 encoding, another type of encoding, or combinations thereof. The learning mechanism may be used to identify a chain to recommend to the user to decode the transport-level encoded payloads.

A learning mechanism may be a rule based heuristics knowledge repository maintained by encoding experts to determine a type of encoding for at least one of the transport-level encoded payloads. Further, the learning mechanism may take a user's inputs into account to determine recommended chains to be displayed with the identified payloads based on previously used encoding types selected by the user.

Transport-level encoded payloads are identified in a display, such as a display in a user interface. Decoding options are displayed with transport-level encoded payloads. One of the decoding options may be a recommended decoding option, such as recommending a recommending chain to decode the payloads. In addition to displaying the recommended chain, other chains may be displayed as other options to decode the payloads. Further, the multiple decoding options may also include an option to not decode the payload. In some examples, each payload is displayed with its own list of decoding options. In other examples, the multiple decoding options may apply to a subset of the payloads.

The user may provide input to select which of the multiple options to apply for each of the payloads. For example, the user may select the recommended chain to decode the payload, or the user may select to decode the payloads with another of the chains. In some circumstances, the user may desire to select a do not decode command.

The display may also include a selection option that allows one of the chains or decoding commands, such as the do not decode command, to apply to a subset of the encoded payloads. For example, the selection option may allow a user to cause a single chain to be applied to multiple encoded payloads. The subset of encoded payloads may share common characteristics or similar characteristics that make each payload of the subset a good candidate to have the same chain or command applied uniformly to them. Such a selection option can save time in circumstances where the same payload reoccurs throughout the recorded script. In other examples, the selection option may be selected to cause a single chain to decode all of the payloads encoded with the same type of encoding. In some examples, the selection option appears to the user in the display in response to the user selection a decoding option. Such a selection option may ask the user if the user would like to apply the selected decoding option to other encoded payloads.

Each transport-level encoded payload is decoded in response to receiving the user input. The transport-level encoded payloads can be decoded using chains with existing and proven decoding methods. In one example, the chain causes a transport-level encoded payload to be decoded into an escaped binary encoding and then encoding the escaped binary encoding into base64 binary encoding. The chain further causes the base64 binary encoding to be decoded again and then encoded into URL encoding. Next, the chain causes the URL encoding to be decoded and then encoded to UTF-8 encoding. The UTF-8 encoding is decoded and the chain finally causes the payload to be encoded into an ASCII encoding. In an example of another chain, the transport-level encoded payload is decoded using URL encoding, which is decoded and then encoded to UTF-8 encoding. While the examples above have been described with reference to chains with specific sequence of events, any appropriate chain sequence or combination may be used to decode a transport-level encoded payload in accordance with the principles described herein.

In response to decoding the transport-level encoded payloads, a load test script is generated. In one example, a user receives the generated load test script. In keeping with the given example, the user selects a transport-level encoded payload in the generated load test script to decode the transport-level encoded payload and to check whether the transport-level decoded payload is decoded in an appropriate format.

The present specification also describes a system for identifying transport-level encoded payloads, the system includes an obtaining script engine to obtain a recorded script with transport-level encoded payloads, a displaying engine to display the transport-level encoded payloads in a display with decoding options, and a decoding engine to decode the transport-level encoded payloads in the recorded script.

The principles described herein also include a computer program product for identifying transport-level encoded payloads that includes a non-transitory computer readable storage medium. The non-transitory computer readable storage medium has computer readable program code embodied therewith that has program instructions that, when executed, cause a processor to identify transport-level encoded payloads in a display and to display multiple decoding options with at least one of the transport-level encoded payloads.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

A chain is an ordered set of encoding and decoding methods to be used consecutively in order to encode or decode a transport-level payload. Specifically, each proven encoding and decoding method is a chain including one method.

Now referring to the figures, FIG. 1A is a diagram of an example of a system for identifying payloads, according to the principles described herein. Web applications use web automation tests to determine how the web application performs in terms of responsiveness and stability under a particular workload. Web automation tests use an application performance tester that is in communication with a client device and a server. The application performance tester analyzes communication between the client device and the server. The communication between the client device and the server are captured as a recorded script. To allow a user to understand the traffic used for testing, and to modify dynamic values to make the web automation test behave within acceptable operating parameters, transport-level encoded payloads are identified and decoded. In response to identifying and decoding the transport-level encoded payloads, a load test script is generated that simulates network traffic generated by the client device. However, the decoded transport-level payloads are then encoded again before replaying a generated load test script.

Turning specifically to FIG. 1A, as mentioned above, the system (100) includes network components such as an application performance tester (101), a client device (150), and a server (160). In one example, the application performance tester (101) analyzes communication between the client device (150) and the server (160). As mentioned above, communications between the client device (150) and the server (160) are captured as a recorded script (120) with transport-level encoded payloads (121). To allow a user to understand the traffic used for testing and to modify dynamic values to execute the test properly, the transport-level encoded payloads (121) are identified and decoded.

To identify and decode transport-level encoded payloads (121), a payload identification and decoding routine (110) is used. The payload identification and decoding routine (110) identifies transport-level encoded payloads (121) in the recorded script (120). The recorded script (120) is scanned to locate the identifiers that reveal the existence of the payloads. The identifiers may be present in the payloads because of the type of encoding used to encode payloads. In other examples, identifiers are specifically added to the payloads when the recorded script (120) is generated. In response to identifying the payloads, the payloads are displayed in a displayed for the user's convenience.

The payload identification and decoding routine (110) continues by identifying the type of encoding used on each transport-level encoded payload (121). The encoding may be identified with a learning mechanism (111) that analyzes historical success encoding identifications to improve its ability to identify encodings of future payloads. Based on the type of encoding and/or other characteristics of the identified payloads, decoding chains compatible for decoding the payloads are identified and presented to the user. The display may include which of the decoding chains is recommended for decoding specific payloads. Other decoding chains and/or other types of decoding options may also be presented to the user through the display.

The payload identification and decoding routine (110) can decode the payloads based on the decoding chain or decoding option selected by the user. The learning mechanism may use a chain repository (112) from which it selects a decoding option to present to the user. A chain repository (112) may include proven methods for decoding transport-level encoded payloads. As will be described in FIG. 1B, a user, using a user interface (151), selects an appropriate chain from the chain repository (112) to decode transport-level encoded payload (121). In some examples, the payload identification and decoding routine (110) uses a learning mechanism (111) to identify transport-level encoded payloads (121) and identifies the type of encoding used on each transport-level encoded payload (121). Further, the payload identification and decoding routine (110) uses chains from a chain repository (112) to decode transport-level encoded payloads (121).

As mentioned above, after the transport-level encoded payloads (121) are decoded (131), a load test script (130) is generated that simulates network traffic generated by the client device (151). Further, replaying a generated load test script (130) simulates a client device's (150) behavior against the web application under the test.

Further, the system (100) includes an identification system (140). The identification system (140) has an obtaining script engine (141), a displaying engine (142), and a decoding engine (143). The engines (141, 142, 143) refer to a combination of hardware and program instructions to perform a designated function. Each of the engines (141, 142, 143) may include a processor and memory. The program instructions are stored in the memory and cause the processor to execute the designated function of the engine. The obtaining script engine (141) obtains a recorded script. The displaying engine (142) displays multiple decoding options with at least one of the transport-level encoded payloads (FIG. 1, 121). The decoding engine (143) decodes the transport-level encoded payloads in response to receiving user input.

Figures 1B, 2:
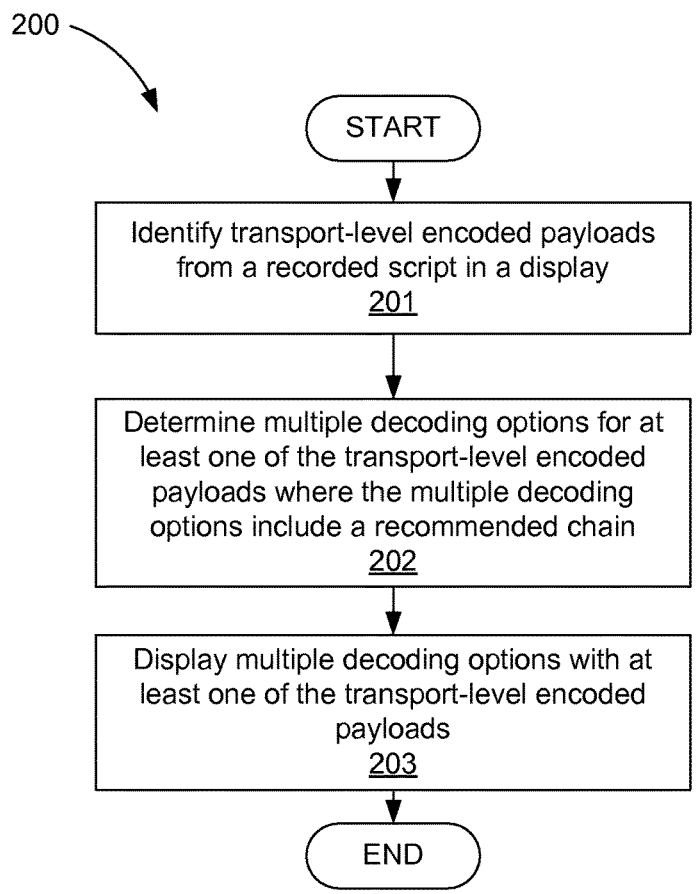
FIG. 1B is a diagram of an example of displaying transport-level encoded payloads and decoding options, according to the principles described herein.
FIG. 2 is a diagram of an example of a method for decoding payloads, according to the principles described herein.

FIG. 1B is a diagram of an example of displaying transport-level encoded payloads and decoding options, according to the principles described herein. In one example, transport-level encoded payloads are displayed to a user using a user interface (FIG. 1, 151). Further, each transport-level encoded payload (180) is shown along with a recommended chain (185) for decoding the transport-level encoded payload (180). Further, transport-level encoded payloads (180) are also displayed along with multiple decoding options such as other chains (190) and other commands (195) such as do not decode commands.

In the example of FIG. 1B, three transport-level encoded payloads (180) are displayed; payload 1, payload 2, payload 3. Although FIG. 1B shows three payloads, any number of payloads can be shown. In keeping with the given example, a learning mechanism (FIG. 1, 111) determined that an appropriate chain to decode payload 1 is chain A. As a result, chain A is displayed as a recommended chain to decode payload 1. As mentioned above, a user may select chain A to decode payload 1. However, the learning mechanism (FIG. 1, 111) may have also determined that payload 1 can also be decoded with chain B and chain E. As a result, chain B and chain E are also displayed as options for decoding payload 1. A user may select chain B or chain E to decode payload 1. Further, other displayed decoding options include a do not decode command. A user may select the do not decode command so that payload 1 is not decoded.

Similarly, for payload 2, the learning mechanism (FIG. 1, 111) determined an appropriate chain to decode payload 2 is chain C. As a result, chain C is displayed as an option to decode payload 2. As mentioned above, a user may selected chain C to decode payload 2. However, the learning mechanism (FIG. 1, 111) may have also determined that payload 2 can also be decoded using chain A. As a result, chain A is displayed as an option to decode payload 2. A user may select chain A to decode payload 2.

Likewise, for payload 3, the learning mechanism (FIG. 1, 111) determined that payload 3 can be decoded with chain D. As a result, chain D is displayed as an option to decode payload 3. As mentioned above, a user may selected chain D to decode payload 3. The learning mechanism (FIG. 1, 111) determined payload 3 may also be decoding using chain B and chain C. As a result, chain B and chain C is displayed as an option to decode payload 3. A user may select chain B or chain C to decode payload 3.

The recommended chain (185) may be a chain that the learning mechanism has the highest confidence in. For example, the learning mechanism may determine that chain A will definitely be capable of decoding payload 1, but be unsure whether chains B and E can decode payload 1. As a result, the learning mechanism causes chain A to be the recommended chain. The recommended chain (185) may be selected based on a recommendation policy. The recommendation policy may be based on a decoding history, a level of confidence, an encoding type, a decoding efficiency, other factors, or combinations thereof.

FIG. 2 is a diagram of an example of a method (200) for identifying and decoding payloads, according to the principles described herein. In this example, the method (200) includes identifying (201) transport-level encoded payloads from a recorded script in a display, determining (202) multiple decoding option for at least one of the transport-level encoded payloads where the multiple decoding options includes a recommended chain, and displaying (203) multiple decoding options with at least one of the transport-level encoded payloads.

As mentioned above, a recorded script can be scanned to search for payload identifiers that are recognized in the recorded script to indicate the presence of an encoded payload. An identifier may be a symbol, a file extension, a character, or any combination thereof to recognize a payload identifier. By using payload identifier, each transport-level encoded payloads can be identified in the recorded script.

In one example, transport-level encoded payloads can be encoded in base64 binary encodings. Base64 binary encoding is a binary to text encoding that represents binary data in an ASCII string format by translating the binary data into a 64 bit representation. Base64 binary encodings use binary values such as "0s" and "1s" in a group of 6 bits. These 6 bit groups of binary values may be used as payload identifiers for base64 encodings. As mentioned above, the recorded script can be scanned to search for payload identifiers for base64 binary encodings. In keeping with the given example, the system may scan the recorded script for 6 bit groups of binary values. A transport-level encoded payload encoded as "010011" may be identified as a base64 binary encoding in the recorded script as a result of the transport-level encoded payload using groups of 6 bit binary values.

In another example, transport-level encoded payloads can be encoded in URL encodings. URL encodings is a mechanism for encoding information in a uniform resource identifier (URI). URL encodings use reserved characters to represent special character sequences. For example, reserved characters may include symbols such as "!", "(", "+", "=", "%", among others. Further, URL encodings use unreserved characters such as letters and number. For example, unreserved characters may be letters such as "A", "z", "r" and numbers such as "0", "9", 7", among others. These reserved and unreserved characters may be used as payload identifiers. As mentioned above, the recorded script can be scanned to search for payload identifiers for URL encodings. In keeping with the given example, the system may search for payload identifiers for URL encodings in the recorded script. A transport-level encoded payload encoded as "%2F" may be identified as a URL encoding in the recorded script as a result of the transport-level encoded payload using reserved and unreserved characters.

In another example, transport-level encoded payloads can be encoded in UTF-8 encoding. UTF-8 encoding is a type of character encoding scheme in which codes of different lengths are used to encode a character set. One-byte codes are used for ASCII binary values 0 to 127. Codes larger than binary values for 127 are represented by multi-bit sequences. Further, a UTF-8 encoding may be encoded using a UTF-8 binary representation, a UTF-8 hexadecimal representation, or a UTF-8 character representation such as "U+". A UTF-8 binary representation, a UTF-8 hexadecimal representation, or a UTF-8 character representation may be used as payload identifiers. In keeping with the given example, the system may search for payload identifiers for UTF-8 encodings such as a UTF-8 binary representation, a UTF-8 hexadecimal representation, or a UTF-8 character representation such as "U+" in a recorded script. For example, a transport-level encoded payload encoded as a UTF-8 binary representation such as "00100100" may be identified as a UTF-8 encoding in the recorded script. A transport-level encoded payload as a UTF-8 hexadecimal representation such as "C2" may be identified as a UTF-8 encoding the recorded script. A transport-level encoded payload encoded as a UTF-8 character representation such as "U+"0024" may be identified as a UTF-8 encodings the recorded script.

Transport-level encoded payloads are displayed to a user using a user interface (FIG. 1, 151). Further, each transport-level encoded payload (FIG. 1B, 180) is shown along with a recommended chain (FIG. 1B, 185) for decoding the transport-level encoded payloads (FIG. 1B, 180). Further, transport-level encoded payloads (FIG. 1B, 180) are also displayed along with multiple decoding options such as other chains (FIG. 1B, 190) and other commands (FIG. 1B, 195) such as do not decode commands.

The transport-level encoded payloads are displayed to a user using a user interface (FIG. 1, 151). Further, each transport-level encoded payload (FIG. 1B, 180) is shown along with a recommended chain (FIG. 1B, 185) for decoding the transport-level encoded payload (FIG. 1B, 180) as well as a decoded version of the transport-level encoded payload (FIG. 1B, 180) using the recommended chain (FIG. 1B, 185). In keeping with the given example, transport-level encoded payloads (FIG. 1B, 180) are also displayed (202) along with multiple decoding options such as other chains (FIG. 1B, 190) and other commands (FIG. 1B, 195).

Figure 3:
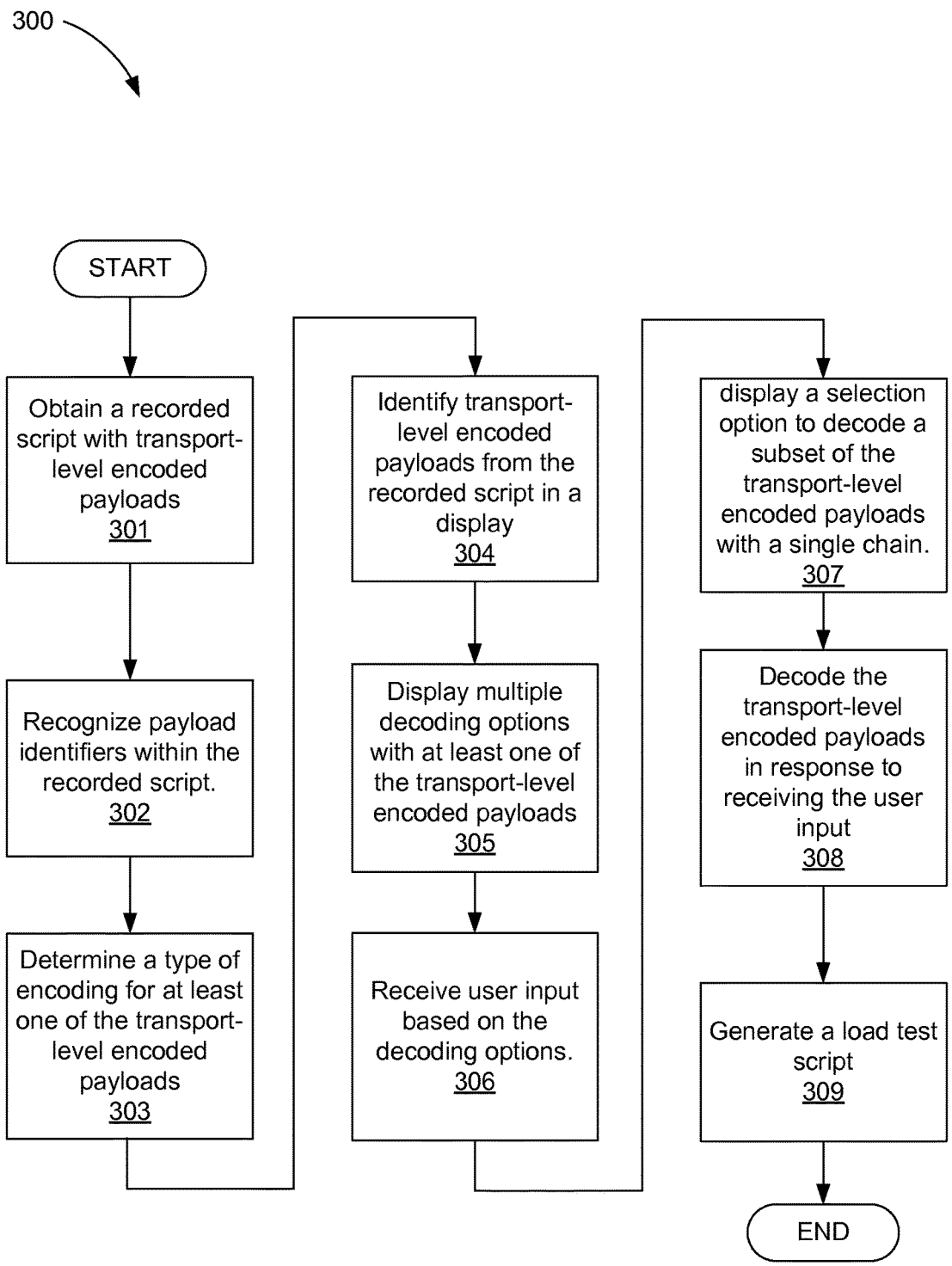
FIG. 3 is a diagram of an example of a method for decoding payloads, according to the principles described herein.

FIG. 3 is a diagram of an example of a method (300) for identifying and decoding payloads, according to the principles described herein. In this example, the method (300) includes obtaining (301) a recorded script with transport-level payloads, recognizing (302) payload identifiers within the recorded script, determining (303) a type of encoding for at least one of the transport-level encoded payloads, identifying (304) transport-level encoded payloads from the recorded script in a display, displaying (305) multiple decoding options with at least one of the transport-level encoded payloads, receiving (306) user input based on the decoding options, displaying (307) a selection option to decode a subset of the transport-level encoded payloads with a single chain, decoding (308) the transport-level encoded payloads in response to receiving the user input, and generating (309) a load test script.

As mentioned above, an application performance tester (FIG. 1, 101) analyzes communication between a client device (FIG. 1, 150) and a server (FIG. 1, 160). The communication between the client device (FIG. 1, 150) and the server (FIG. 1, 160) are captured as a recorded script (FIG. 1, 120) with transport-level encoded payloads (FIG. 1, 121). After the transport-level encoded payloads (FIG. 1, 121) are identified, multiple decoding options with at least one of the transport-level encoded payload (FIG. 1, 121) is displayed. In one example, the user selects a decoding option to decode of the transport-level encoded payloads (FIG. 1, 121). Once all the transport-level encoded payloads (FIG. 1, 121) are decoded, a load test script is generated (FIG. 1, 130) based on the decoded payloads. The generated load test script (FIG. 1, 130) simulates network traffic generated by the client device (FIG. 1, 150) to test a web application for correct operation. While this example and the examples above have been described with reference to generating a test load script based on the decoded payloads, any appropriate script to be executed may be generated based on the decoded payloads in accordance with the principles described herein.

Turning specifically to FIG. 3, a recorded script is obtained (301) with transport-level encoded payloads. As mentioned above, the recorded script (FIG. 1, 120) is a set of transport-level payloads (FIG. 1, 121). The transport-level payloads (FIG. 1, 121) are encoded in a number of encoding formats. To determine which of the decoding chains are appropriate to decode the various payloads, characteristics of the payloads, such as their encodings types, are determined. Some decoding chains work well for decoding specific types of encodings while the same decoding chains may not work as well or at all. As a consequence, the learning mechanism determines the encoding types of the payloads as part of the process for selecting decoding payloads to present to the user.

In one example, the transport-level payloads (FIG. 1, 121) are encoded using a Binary64 encoding. In another example, the transport-level payloads (FIG. 1, 121) are encoded using URL encoding. In yet another example, the transport-level payloads (FIG. 1, 121) are encoded using UTF-8 encoding. Further, the transport-level payloads (FIG. 1, 121) may be encoded with any appropriate combination thereof. While this example and the examples above have been described with reference to specific types of encoding, any appropriate type of encoding may be used to encode the payloads according to the principles described herein.

The transport-level encoded payloads in the recorded script are scanned to recognize (302) the payload identifiers by searching for indicators that reveal the existence of a payload. For example, the identifiers may include tokens, tags, metadata, symbols, codes, patterns, other identifiers, or combinations thereof that indicate the presence of an encoded payload in the script.

Further, a learning mechanism (FIG. 1, 111) may implement heuristics to determine the type of encoding applied to the encoded payloads. A recommendation engine (FIG. 1, 113) recommends a chain to the user to decode the encoded payload based on the type of encoding for each payload.

The recommendation engine (FIG. 1, 113) may use a recommendation policy to recommend a chain to the user. The recommendation policy may be based on a selection policy that considers which chains have worked for other encoded payloads, which chains have not worked for other encoded payloads, which chains are historically the most efficient at decoding payloads, other factors, or combinations thereof.

For example, a learning mechanism (FIG. 1, 111) may be used to determine that a transport-level encoded payload (FIG. 1, 121) is encoded using Binary64 encoding. As such, the recommendation engine (FIG. 1, 113) can recommend chains that effectively decode payloads encoded with a Binary64 encoding. In another example, a learning mechanism (FIG. 1, 111) is used to determine that a transport-level encoded payload (FIG. 1, 121) is encoded using URL encoding. In yet another example, a learning mechanism (FIG. 1, 111) is used to determine that a transport-level encoded payload (FIG. 1, 121) is encoded using UTF-8 encoding. As a result, heuristics (FIG. 1, 111) is used to determine a degree of certainty that each transport-level encoded payload (FIG. 1, 121) is encoded by a certain type of encoding.

The displaying engine (142, FIG. 1) displays decoding options that correspond with the identified transport-level encoded payloads (FIG. 1, 121). Such decoding options are dynamically selected by the identification engine (140, FIG. 1) for each of the transport-level encoded payloads (FIG. 1, 121). For example, the identification engine (140, FIG. 1) will determine the appropriate decoding options for a first transport-level encoded payload. These selected decoding options may be difference for a second transport-level encoded payload with different characteristics. Thus, the identification engine (140, FIG. 1) considers the characterisitics of each of the transport-level encoded payloads (FIG. 1, 121) to select the appropriate decoding options.

User input is received when the user selects one of the decoding options. For example, the user may select an option to have the transport-level encoded payloads (FIG. 1, 121) decoded with the recommended chain. The user may select the option through a touch screen input, a keyboard input, curser input, another type of input, or combinations thereof. In such an example, a processor of the identification system (140, FIG. 1) receives the user input to decode with the selected option.

In some examples, the user has a selection option that allows the user to create a rule to have the decoding engine (FIG. 1, 143) automatically apply a chain to a subset of the encoded payloads. The subset of encoded payloads may be payloads that are exactly the same, payloads that are similar, payloads that have the exact same encoding type, payloads that have similar encoding types, other similar characteristics, or combinations thereof. Such a feature further saves the user time and effort when identifying and decoding the encoded payloads in the recorded script.

The transport-level encoded payloads (FIG. 1, 121) can be decoded using existing and proven decoding methods. In one example, a transport-level encoded payload (FIG. 1, 121) is decoded (306) by a chain (FIG. 1, 112) using escaped binary and encoding the escaped binary into base64 binary. The base64 binary is decoded and is then encoded into URL encoding. The URL encoding is decoded and then encoded to UTF-8 encoding. The UTF-8 encoding is decoded and is finally encoded to ASCII. In another example, a transport-level encoded payload (FIG. 1, 121) is decoded (306) by a chain (FIG. 1, 112) using URL encoding. The URL encoding is decoded and then encoded to UTF-8 encoding. Further, any other appropriate chain (FIG. 1, 112) combination may be used to decode (306) a transport-level encoded payload. (FIG. 1, 121).

Once all the transport-level encoded payloads are decoded, a load test script is generated (309). In one example, a user receives the generated load test script (FIG. 1, 130). In keeping with the given example, the user right-clicks on a transport-level encoded payload (FIG. 1, 121) in the generated load test script (FIG. 1, 130) to decode the transport-level encoded payload (FIG. 1, 121). Further, the user checks if the decoded payload (FIG. 1, 131) is decoded in an appropriate format. As mentioned above, the generated load test script (FIG. 1, 130) is used to test a web application for correct operation. If the generated load test script (FIG. 1, 130) indicates that the web application is performing outside of acceptable operating parameters, the user can change operating conditions by selecting a different chain to decode a transport-level encoded payload to improve the web application's performance.

Figure 4:
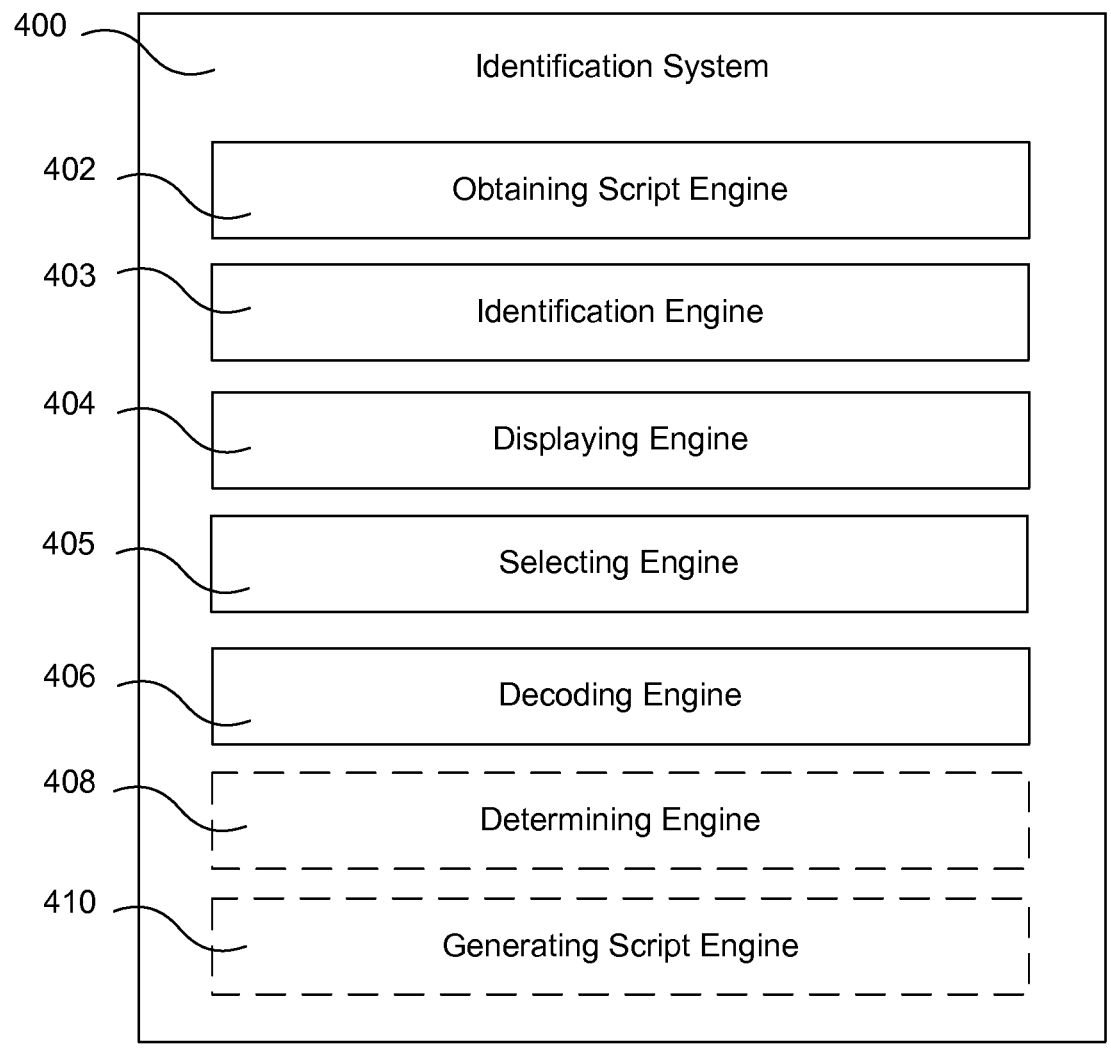
FIG. 4 is a diagram of an example of an identification system, according to the principles described herein.

FIG. 4 is a diagram of an example of an identification system (400) according to the principles described herein. In this example, the identification system (400) includes an obtaining script engine (402), an identification engine (403), a displaying engine (404), a selecting engine (405), and a decoding engine (406). In this example, the system (400) also includes a determining engine (408) and a generating script engine (410). The engines (402, 403, 404, 405, 406, 408, 410) refer to a combination of hardware and program instructions to perform a designated function. Each of the engines (402, 403, 404, 405, 406, 408, 410) may include a processor and memory. The program instructions are stored in the memory and cause the processor to execute the designated function of the engine.

The obtaining script engine (402) obtains a recorded script. As mentioned above, the recorded script (FIG. 1, 120) is a set of transport-level encoded payloads (FIG. 1, 121). The transport-level encoded payloads (FIG. 1, 121) are encoded in a number of encoding formats. In one example, the transport-level encoded payloads (FIG. 1, 121) are encoded using Binary64 encoding. In another example, the transport-level encoded payloads (FIG. 1, 121) are encoded using URL encoding. In yet another example, the transport-level encoded payloads (FIG. 1, 121) are encoded using UTF-8 encoding.

The identification engine (403) identifies the payloads in the recorded script. The identification engine (403) scans the recorded script and recognizes the existence of a payload based on the presence of an identifier in the payloads. The identifiers may include symbols, file extensions, metadata, symbols, other identifiers or combinations thereof. The identifiers may be dependent on the encoding type used to encode the payloads.

The displaying engine (404) displays multiple decoding options with at least one of the transport-level encoded payloads. As mentioned above, transport-level encoded payloads are displayed to a user using a user interface (FIG. 1, 151). Further, each transport-level encoded payload is shown along with a recommended chain (FIG. 1B, 185) for decoding the transport-level encoded payload as well as a decoded version of the transport-level encoded payload using the recommended chain. In keeping with the given example, transport-level encoded payloads are also displayed along with multiple decoding options such as other chains (FIG. 1B, 190) and other commands (FIG. 1B, 195).

The selecting engine (405) dynamically selects the decoding options for the transport-level encoded payloads. The decoding options include a recommended option with a recommended chain to decode the corresponding transport-level encoded payload. Other decoding options include using other decoding chains or an option to not decode the transport-level encoded payload at all.

The decoding engine (406) decodes each encoded payload using an appropriate chain. In one example, each transport-level encoded payload (FIG. 1, 121) is decoded using Binary64 encoding. In another example, each transport-level encoded payload (FIG. 1, 121) is decoded using URL encoding. In yet another example, each transport-level encoded payload (FIG. 1, 121) is decoded using UTF-8 encoding.

The determining engine (408) determines a type of encoding for at least one of the transport-level encoded payloads. As mentioned above, a learning mechanism (FIG. 1, 111) is used to determine a type of encoding for at least one of the transport-level encoded payload (FIG. 1, 121). For example, a learning mechanism (FIG. 1, 111) may be a heuristics repository to aid in determining the type of encoding for at least one transport-level encoded payload (FIG. 1, 121). In one example, a learning mechanism (FIG. 1, 111) is used to determine that a transport-level encoded payload (FIG. 1, 121) is encoded using Binary64 encoding, URL encoding, UTF-8 encoding, another type of encoding, or combinations thereof.

The generating script engine (410) generates a test load script. In one example, the generated test load script (FIG. 1, 130) is in human readable form and is easily modified with user input. As a result, a user can edit the generated test load script (FIG. 1, 130) by selecting a different chain to decode a transport-level encoded payload to improve the web application's performance.

Figure 5:
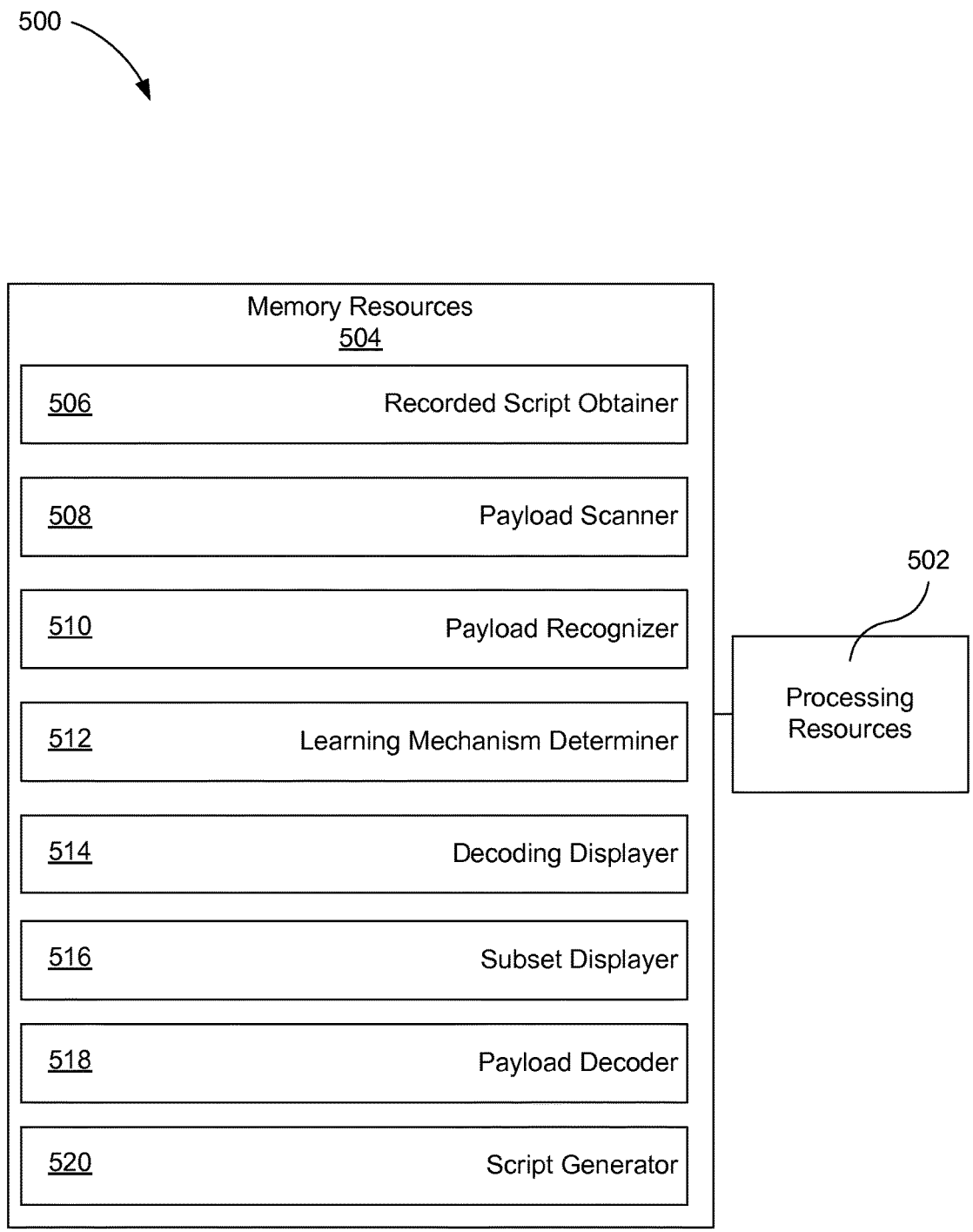
FIG. 5 is a diagram of an example of an identification system, according to the principles described herein.

FIG. 5 is a diagram of an example of an identification system (500), according to the principles described herein. In this example, the identification system (500) includes processing resources (502) that are in communication with memory resources (504). Processing resources (502) include at least one processor and other resources used to process programmed instructions. The memory resources (504) represent generally any memory capable of storing data such as programmed instructions or data structures used by the identification system (500). The programmed instructions shown stored in the memory resources (504) include a recorded script obtainer (506), a payload scanner (510), a payload recognizer (510), a learning mechanism determiner (512), a decoding displayer (514), a subset displayer (516), a payload decoder (518), and a script generator (520).

The memory resources (504) include a computer readable storage medium that contains computer readable program code to cause tasks to be executed by the processing resources (502). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic based memory, or types of memory, or combinations thereof.

The recorded script obtainer (506) represents programmed instructions that, when executed, cause the processing resources (502) to obtain a recorded script. The payload scanner (508) represents programmed instructions that, when executed, cause the processing resources (502) to scan each transport-level encoded payload (FIG. 1, 121) in the recorded script (FIG. 1, 121). The payload recognizer (510) represents programmed instructions that, when executed, cause the processing resources (502) to recognize transport-level encoded payload (FIG. 1, 121) in a recorded script. The learning mechanism determiner (512) represents programmed instructions that, when executed, cause the processing resources (502) to determine a type of encoding for a transport-level encoded payload (FIG. 1, 121).). The decoding displayer (514) represents programmed instructions that, when executed, cause the processing resources (502) to display multiple decoding options with at least one of the transport-level encoded payload (FIG. 1, 121). The subset displayer (516) represents programmed instructions that, when executed, cause the processing resources (502) to display a subset of transport-level encoded payload with a single chain. The payload decoder (518) represents programmed instructions that, when executed, cause the processing resources (502) to decode transport-level encoded payloads (FIG. 1, 121) using a chain (FIG. 1, 112). The script generator (520) represents programmed instructions that, when executed, cause the processing resources (502) to generate a load test script (FIG. 1, 130).

Further, the memory resources (504) may be part of an installation package. In response to installing the installation package, the programmed instructions of the memory resources (504) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (502) and the memory resources (504) are located within the same physical component, such as a server, or a network component. The memory resources (504) may be part of the physical component's main memory, caches, registers, non-volatile memory, or elsewhere in the physical component's memory hierarchy. Alternatively, the memory resources (504) may be in communication with the processing resources (502) over a network. Further, the data structures, such as the libraries and may be accessed from a remote location over a network connection while the programmed instructions are located locally. Thus, the identification system (500) may be implemented on a user device, on a server, on a collection of servers, or combinations thereof.

The identification system (500) of FIG. 5 may be part of a general purpose computer. However, in alternative examples, the identification system (500) is part of an application specific integrated circuit.

While the examples above have been described with reference to user interface, any appropriate type of user interface may be used in accordance to the principles described herein. For example, the user interface may be an auditory user interface, a voice recognition user interface, a touch screen user interface, a motion detected hand gesture interface, another type of user interface, or combinations thereof.

The preceding description has been presented to illustrate and describe examples of the principles described. This description is not intended to be exhaustive or to limit these principles to any precise form. Many modifications and variations are possible in light of the above teaching.

What is claimed is:

1. A non-transitory computer readable storage medium storing program instructions that, when executed, cause a system to:
   identify transport-level encoded payloads in a recorded script produced based on capturing communications between devices over a network;
   identify payload identifiers of the transport-level encoded payloads, wherein the payload identifiers identify one or more types of encoding used on the transport-level encoded payloads;
   determine the one or more types of encoding used on the transport-level encoded payloads from the identified payload identifiers;
   determine decoding options for the transport-level encoded payloads based on the determined one or more types of encoding used, where the determining comprises identifying multiple decoding options for a first transport-level encoded payload of the transport-level encoded payloads based on a determined type of encoding used on the first transport-level encoded payload; and
   cause display of the determined decoding options with the transport-level encoded payloads in a display device.

2. The non-transitory computer readable storage medium of claim 1, wherein the program instructions when executed cause the system to receive user input selecting a first decoding option of the multiple decoding options identified for the first transport-level encoded payload.

3. The non-transitory computer readable storage medium of claim 2, wherein the program instructions when executed cause the system to decode the first transport-level encoded payload using the first decoding option selected in response to the user input.

4. The non-transitory computer readable storage medium of claim 3, wherein the program instructions when executed cause the system to generate a test load script using decoded payloads produced from decoding the transport-level encoded payloads.

5. The non-transitory computer readable storage medium of claim 1, wherein the program instructions when executed cause the system to use a learning mechanism to dynamically select the multiple decoding options for the first transport-level encoded payload.

6. The non-transitory computer readable storage medium of claim 5, wherein the learning mechanism comprises a rule based heuristics knowledge repository.

7. The non-transitory computer readable storage medium of claim 1, wherein the program instructions when executed cause the system to display a selection option that causes the system to decode a subset of the transport-level encoded payloads with a single chain of an encoding and a decoding.

8. The non-transitory computer readable storage medium of claim 1, wherein the program instructions when executed cause the system to identify the transport-level encoded payloads by recognizing the payload identifiers within the recorded script.

9. The non-transitory computer readable storage medium of claim 1, wherein the multiple decoding options identified for the first transport-level encoded payload comprises a chain of encoding and decoding methods to apply to the first transport-level encoded payload to decode the first transport-level encoded payload, wherein the chain is an ordered set of the encoding and decoding methods to be automatically run consecutively during decoding of the first transport-level encoded payload.

10. The non-transitory computer readable storage medium of claim 9, wherein the program instructions when executed cause the system to decode the first transport-level encoded payload using the chain.

11. The non-transitory computer readable storage medium of claim 1, wherein causing the display comprises causing the display of a first decoding option of the multiple decoding options as a recommended decoding option for the first transport-level encoded payload, and a second decoding option of the multiple decoding options as an alternative decoding option for the first transport-level encoded payload.

12. The non-transitory computer readable storage medium of claim 1, wherein the determined types of encoding used on the transport-level encoded payloads is not received in the communications between the devices over the network.

13. A system comprising:
a processor; and
a non-transitory storage medium storing program instructions executable on the processor to:
receive a recorded script with transport-level encoded payloads, the recorded script produced based on capturing communications between devices over a network;
identify the transport-level encoded payloads in the recorded script;
identify payload identifiers of the transport-level encoded payloads, wherein the payload identifiers identify one or more types of encoding used on the transport-level encoded payloads;
determine the one or more types of encoding used on the transport-level encoded payloads from the identified payload identifiers;
dynamically select multiple decoding options for a first transport-level encoded payload of the transport-level encoded payloads based on the determined one or more types of encoding used on the first transport-level encoded payload, where a first decoding option of the multiple decoding options includes a recommended chain of an encoding and decoding to apply to the first transport-level encoded payload to decode the first transport-level encoded payload;
cause display of the transport-level encoded payloads in a display device with respective decoding options; and
decode the transport-level encoded payloads in the recorded script.

14. The system of claim 13, wherein the identifying of the transport-level encoded payloads comprises scanning the recorded script for payload identifiers within the recorded script.

15. The system of claim 13, wherein the program instructions are executable on the processor to receive a user input selecting a first decoding option of the multiple decoding options for the first transport-level encoded payload, wherein the decoding comprises decoding the first transport-level encoded payload using the first decoding option selected by the user input.

16. A method comprising:
receiving, by a system comprising a processor, a recorded script with transport-level encoded payloads based on capturing communication between network components;
identifying, by the system, the transport-level encoded payloads in the recorded script;
identifying, by the system, payload identifiers of the transport-level encoded payloads, wherein the payload identifiers identify one or more types of encoding used on the transport-level encoded payloads;
determining, by the system, the one or more types of encoding used on the transport-level encoded payloads from the identified payload identifiers;
dynamically selecting, by the system, decoding options for the transport-level encoded payloads based on the determined one or more types of encoding used, where the selecting comprises selecting multiple decoding options for a first transport-level encoded payload of the transport-level encoded payloads based on a determined type of encoding used on the first transport-level encoded payload;
displaying, by the system, the transport-level encoded payloads in a display device with the selected decoding options;
decoding, by the system, the transport-level encoded payloads in the recorded script; and
generating, by the system, a test load script based on decoded payloads produced by the decoding of the transport-level encoded payloads.

17. The method of claim 16, wherein identifying the transport-level encoded payloads comprises recognizing the payload identifiers within the recorded script.

18. The method of claim 16, further comprising assigning different confidence measures to the multiple decoding options for the first transport-level encoded payload, wherein a decoding option of the multiple decoding options with a highest confidence measure of the different confidence measures is presented as a recommended decoding option for the first transport-level encoded payload.

19. The method of claim 16, further comprising:
receiving a user input selecting a first decoding option of the multiple decoding options for the first transport-level encoded payload,
wherein the decoding comprises decoding the first transport-level encoded payload using the first decoding option selected by the user input.

* * * * *